Patented Nov. 26, 1940

2,223,277

UNITED STATES PATENT OFFICE 2,223,277

ALGINATED EVAPORATED MILK AND PROCESS OF MAKING SAME

Vernon K. Wilt, Los Angeles, Calif., assignor to Kelco Company, Los Angeles, Calif., a corporation of Delaware No Drawing. Application August 16, 1938, Serial No. 225,232

11 Claims. (Cl. 99—55)

This invention relates to evaporated milk, and its object is to enhance the edible and keeping qualities of evaporated milk, and to provide an evaporated milk having higher viscosity and less liable to graininess or clumping, cream separation and cream plugging than the ordinary evaporated milks now on the market. The invention includes the method of alginating evaporated milk and the product of such method.

Heretofore milk evaporated to the desired consistency often has a scorched color and flavor, some graininess and a tendency to cream separation and cream plugging in the cans. The scorched flavor is a result of the prolonged heating needed to give the desired consistency. The "graininess" is a result of a breakdown of the colloids of the milk due to the heating and is very difficult to control. Calcium or phosphate salts have been used in attempts to overcome this defect, but have not always been successful. The "plugging" is caused by the cream rising to the top of the evaporated milk during storage, and such cream is so concentrated that it will not pour out through holes in the top of the can. Even violent shaking, prior to opening the can, will not always completely disperse the separated and plugged cream.

I have discovered that by adding an edible water soluble alginate to evaporated milk during the manufacture thereof, the resultant evaporated milk product is greatly improved and has a higher viscosity, is more free from graininess or clumping, and is less liable to cream separation and cream plugging.

The alginated evaporated milk is also more easily digestible. This can be demonstrated by adding hydrochloric acid to a water solution of evaporated milk. If ordinary evaporated milk (without any alginate) is used it congeals and forms readily discernible masses which would be difficult to digest. If my alginated evaporated milk is used in such test it will form extremely fine curds, and this is particularly valuable in evaporated milk used for feeding infants.

One method of alginating evaporated milk in accordance with my invention is as follows:

Put five hundred gallons of milk in a vacuum pan and heat it to a temperature of 160° F., then add thereto one pound of an edible sodium alginate compound (such f. i. as described in United States Patent No. 2,097,224). Then continue evaporation until the alginated milk is reduced to two hundred and fifty gallons. The milk may then be canned, and the cans sterilized at 240° F. for fifteen minutes. The final evaporated milk product contains approximately .05% of the alginate compound.

Instead of the sodium alginate compound as described above, I may use any edible alginate, which preferably should be first dissolved in water and the resultant solution added to the milk in the evaporator. The edible alginates disclosed in United States Patents Nos. 2,097,225, 2,097,228 and 2,000,807 might also be used.

If alginates disclosed in United States Patent No. 2,097,228 are used, a gel may form in the cans, but vigorous shaking will disperse such gel.

I now prefer to use a concentration of .03 to .08% of a phospho-alginate compound, as higher concentrations will give gel formations, and lower concentrations are not as effective.

I have also found that a compound of phospho-alginate and Irish moss (as described in United States Patent No. 2,097,224) is particularly effective in alginating evaporated milk, and no gel forms in such evaporated milk when canned.

The alginate compounds may be added at any convenient step in the manufacture of the evaporated milk. The alginates may be dissolved in any suitable convenient way prior to the addition thereof to the milk.

I claim:

1. The method of alginating milk, consisting in adding a small percentage of an edible alginate compound to the milk in the evaporating pan when the milk has reached a temperature of approximately 160° F.; and then continuing evaporation until the milk is reduced to the desired consistency.

2. The method of producing alginated evaporated milk consisting in adding to the milk during the process of evaporation thereof a phospho-alginate compound, and then evaporating the milk to the desired consistency.

3. The method of producing alginated evaporated milk consisting in adding to the milk during the process of evaporation thereof a compound of phospho-alginate and Irish moss, and then evaporating the milk to the desired consistency.

4. Evaporated milk containing an edible alginate compound.

5. Evaporated milk containing a phospho-alginate compound.

6. Evaporated milk containing a compound of phospho-alginate and Irish moss.

7. The method of producing alginated milk, consisting in adding to substantially 500 gallons of milk when it has reached a temperature of approximately 160° F., substantially 1 lb. of an edible alginate, and then completing evaporation of the milk.

8. The method of producing alginated evaporated milk consisting in adding to substantially 500 gallons of milk during the process of evaporation thereof, a solution of substantially 1 lb. of an edible alginate, and then completing the evaporation of the milk.

9. Evaporated milk containing substantially .03%–.08% of an edible alginate compound.

10. Evaporated milk containing substantially .03%–.08% of a phospho-alginate compound.

11. The method of producing alginated evaporated milk consisting in introducing an alginate into the milk during the manufacture thereof.

VERNON K. WILT.